(12) United States Patent
Sanmoogan et al.

(10) Patent No.: US 12,149,947 B2
(45) Date of Patent: Nov. 19, 2024

(54) WIRELESS TELECOMMUNICATIONS NETWORK RECONFIGURATION BASED ON ZONE PROPERTIES AT DIFFERENT TIME INSTANCES

(71) Applicant: BRITISH TELECOMMUNICATIONS PUBLIC LIMITED COMPANY, London (GB)

(72) Inventors: Timothy Sanmoogan, London (GB); Arjun Parekh, London (GB); Douglas Fripp, London (GB); Derick Nel, London (GB)

(73) Assignee: BRITISH TELECOMMUNICATIONS PUBLIC LIMITED COMPANY (GB)

(*) Notice: Subject to any disclaimer, the term of this patent is extended or adjusted under 35 U.S.C. 154(b) by 0 days.

(21) Appl. No.: 18/710,420

(22) PCT Filed: Nov. 7, 2022

(86) PCT No.: PCT/EP2022/080908
§ 371 (c)(1),
(2) Date: May 15, 2024

(87) PCT Pub. No.: WO2023/094135
PCT Pub. Date: Jun. 1, 2023

(65) Prior Publication Data
US 2024/0334196 A1 Oct. 3, 2024

(30) Foreign Application Priority Data
Nov. 24, 2021 (GB) ...................... 2116929

(51) Int. Cl.
*H04W 16/10* (2009.01)
*H04W 28/18* (2009.01)

(52) U.S. Cl.
CPC .......... *H04W 16/10* (2013.01); *H04W 28/18* (2013.01)

(58) Field of Classification Search
CPC ... H04W 16/04–10; H04W 16/18–225; H04W 28/02–0215;
(Continued)

(56) References Cited

U.S. PATENT DOCUMENTS 9,918,238 B2 3/2018 Chou
10,230,510 B2 3/2019 Yogeeswaran et al.
(Continued)

FOREIGN PATENT DOCUMENTS

CN 102472809 B 2/2015
CN 113159109 A 7/2021
(Continued)

OTHER PUBLICATIONS

"Green Radio: Dynamic Power Saving Configuration for Mobile Networks", Data Study Group Final Report: Telenor, GSM Association, Sep. 2-6, 2019, 39 pages.
(Continued)

*Primary Examiner* — Ronald Eisner

(57) ABSTRACT

This disclosure provides a method of configuring a wireless telecommunications network, the wireless telecommunications network having a first transceiver serving a first plurality of User Equipment (UE) in a first coverage area.

10 Claims, 5 Drawing Sheets

(58) Field of Classification Search
CPC ........... H04W 28/0231–0263; H04W 28/0289; H04W 28/06–082; H04W 28/086–0861; H04W 28/18–26; H04W 72/50; H04W 72/52–569; H04W 16/00–32; H04W 28/00–26; H04W 52/00–60; H04W 72/00–0473; H04W 72/12–1273
See application file for complete search history.

(56) References Cited

U.S. PATENT DOCUMENTS

| | | | |
|---|---|---|---|
| 10,440,503 | B2 | 10/2019 | Tapia |
| 10,952,157 | B2 | 3/2021 | Han et al. |
| 2011/0177831 | A1 | 7/2011 | Huang |
| 2015/0045043 | A1 | 2/2015 | Chou |
| 2023/0022247 | A1* | 1/2023 | Lundén ................ H04W 24/08 |

FOREIGN PATENT DOCUMENTS

| | | |
|---|---|---|
| CN | 108770002 B | 8/2021 |
| EP | 3046358 B1 | 5/2020 |
| WO | 2018189573 A1 | 10/2018 |
| WO | 2021111032 A1 | 6/2021 |

OTHER PUBLICATIONS

International Preliminary Report on Patentability received for PCT Patent Application No. PCT/EP2022/077779, mailed on Jan. 4, 2024, 15 pages.
International Search Report and Written Opinion received for PCT Patent Application No. PCT/EP2022/077779, mailed on Jan. 3, 2023, 20 pages.
International Search Report and Written Opinion received for PCT Patent Application No. PCT/EP2022/080908, mailed on Apr. 18, 2023, 15 pages.
Office Action received for Great Britain Patent Application No. 2116929.7, mailed on Jul. 19, 2022, 9 pages.
Office Action received for Great Britain Patent Application No. 2116929.7, mailed on Nov. 29, 2022, 4 pages.
Office Action received for Great Britain Patent Application No. 2117099.8, mailed on Sep. 12, 2022, 13 pages.
"Proposed updated for Draft M.resm-AI: Requirements for Energy Saving Management of 5G RAN System with AI", SG2-1031, International Telecommunication Union, May 27-Jun. 5, 2020, pp. 1-16.
"Second Written Opinion of the International Preliminary Examining Authority received for PCT Patent Application No. PCT/EP2022/077779, mailed on Oct. 9, 2023", 6 pages.
3GPP TR 28.812 V17.1.0 (Dec. 2020), "3rd Generation Partnership Project; Technical Specification Group Services and System Aspects; Telecommunication management; Study on scenarios for Intent driven management services for mobile networks (Release 17)", 650 Route des Lucioles—Sophia Antipolis Valbonne—France, Dec. 2020, 45 pages.
Bellini, et al., "Wi-Fi Based City Users' Behaviour Analysis for Smart City", Journal of Visual Languages and Computing, vol. 42, 2017, pp. 31-45.
Tinguely, et al., "How to Forecast Mobile Network Traffic Using Machine Learning", Datatonic & Vodafone: AI-Powered 5G, 2021, 9 pages.
Zhong, et al., "Characterizing Passenger Flow for a Transportation Hub Based on Mobile Phone Data", IEEE Transactions on Intelligent Transportation Systems, vol. 18, No. 6, Jun. 2017, pp. 1507-1518.
"International Preliminary Report on Patentability received for PCT Patent Application No. PCT/EP2022/080908, mailed on Jun. 6, 2024", 8 pages.

* cited by examiner

WIRELESS TELECOMMUNICATIONS NETWORK RECONFIGURATION BASED ON ZONE PROPERTIES AT DIFFERENT TIME INSTANCES

PRIORITY CLAIM

The present application is a National Phase entry of PCT Application No. PCT/EP2022/080908, filed Nov. 7, 2022, which claims priority from GB Application No. 2116929.7, filed Nov. 24, 2021, each of which hereby fully incorporated herein by reference.

TECHNICAL FIELD

The present disclosure relates to a wireless telecommunications network.

BACKGROUND

It is useful for an operator of a wireless telecommunications network to understand a geographical distribution of users (or other geographical distributions, such as a geographical distribution of user traffic) in the network. The distribution(s) may be used to configure the existing network or to plan upgrades to the network. Conventional techniques for determining the distribution of user traffic in a wireless telecommunications network include Minimization of Drive Tests (MDT) and geolocation.

In MDT, User Equipment (UE) periodically record their location using a Global Navigation Satellite System (GNSS) technique and report it to an MDT data controller. There are limitations with MDT in that only a subset of UE in the network (that is, those using the Android® operating system and giving permission to such data collection) report their locations, such that the data is not representative of the entire population of users in the network.

Geolocation techniques require the UE and/or base station to determine the location of the UE. However, these techniques require a large volume of data to be collected at a significant computational cost. This means that these techniques are often restricted to certain areas.

SUMMARY

According to a first aspect of the disclosure, there is provided a method of configuring a wireless telecommunications network, the wireless telecommunications network having a first transceiver serving a first plurality of User Equipment (UE) in a first coverage area, and a second transceiver serving a second plurality of UE in a second coverage area, the method comprising: obtaining an indication of a respective distance between each UE of the first plurality of UE and the first transceiver at a first time instance and a second time instance, wherein the respective distances are used by the first transceiver to facilitate communications with the respective UE; obtaining an indication of a respective distance between each UE of the second plurality of UE and the second transceiver at the first time instance and the second time instance, wherein the respective distances are used by the second transceiver to facilitate communications with the respective UE; dividing the first coverage area into a first set of coverage area portions; dividing the second coverage area into a second set of coverage area portions; assigning each UE of the first plurality of UE to a respective coverage area portion of the first set of coverage area portions based on the respective distances between that UE and the first transceiver at the first time instance and second time instance so as to determine respective UE densities in each coverage area portion of the first set of coverage area portions at the first time instance and second time instance; assigning each UE of the second plurality of UE to a respective coverage area portion of the second set of coverage area portions based on the respective distances between that UE and the second transceiver at the first time instance and second time instance so as to determine respective UE densities in each coverage area portion of the second set of coverage area portions at the first time instance and second time instance; identifying a first zone covered by a first coverage area portion of the first set of coverage area portions and by a first coverage area portion of the second set of coverage area portions; determining respective properties of the first zone at the first time instance and second time instance based on the respective UE densities in the first coverage area portion of the first set of coverage area portions at the first time instance and second time instance and the respective UE densities in the first coverage area portion of the second set of coverage area portions at the first time instance and second time instance; and reconfiguring the wireless telecommunications network based on the respective properties of the first zone at the first time instance and second time instance.

The method of the first aspect of the disclosure may be defined as: a method of configuring a wireless telecommunications network, the wireless telecommunications network having a first transceiver serving a first plurality of User Equipment (UE) in a first coverage area, and a second transceiver serving a second plurality of UE in a second coverage area, the method comprising: obtaining an indication of a distance between each UE of the first plurality of UE and the first transceiver at a first time instance, wherein the distance is used by the first transceiver to facilitate communications with the respective UE; obtaining an indication of a distance between each UE of the second plurality of UE and the second transceiver at the first time instance, wherein the distance is used by the second transceiver to facilitate communications with the respective UE; obtaining an indication of a distance between each UE of the first plurality of UE and the first transceiver at a second time instance, wherein the distance is used by the first transceiver to facilitate communications with the respective UE; obtaining an indication of a distance between each UE of the second plurality of UE and the second transceiver at the second time instance, wherein the distance is used by the second transceiver to facilitate communications with the respective UE; dividing the first coverage area into a first set of coverage area portions; dividing the second coverage area into a second set of coverage area portions; assigning each UE of the first plurality of UE to a coverage area portion of the first set of coverage area portions based on the distance between that UE and the first transceiver at the first time instance so as to determine a UE density in each coverage area portion of the first set of coverage area portions at the first time instance; assigning each UE of the second plurality of UE to a coverage area portion of the second set of coverage area portions based on the distance between that UE and the second transceiver at the first time instance so as to determine a UE density in each coverage area portion of the second set of coverage area portions at the first time instance; assigning each UE of the first plurality of UE to a coverage area portion of the first set of coverage area portions based on the distance between the UE and the first transceiver at a second time instance so as to determine a UE density in each coverage area portion of the first set of coverage area portions at the second time instance; assigning each UE of the second plurality of UE to a coverage area portion of the second set of coverage area portions based on the distance between the UE and the second transceiver at the second time instance so as to determine a UE density in each coverage area portion of the second set of coverage area portions at the second time instance; identifying a first zone covered by a first coverage area portion of the first set of coverage area portions and by a first coverage area portion of the second set of coverage area portions; determining a property of the first zone at the first time instance based on the UE density in the first coverage area portion of the first set of coverage area portions at the first time instance and the UE density in the first coverage area portion of the second set of coverage area portions at the first time instance; determining a property of the first zone at the second time instance based on the UE density in the first coverage area portion of the first set of coverage area portions at the second time instance and the UE density in the first coverage area portion of the second set of coverage area portions at the second time instance; and reconfiguring the wireless telecommunications network based on the property of the first zone at the first time instance and further based on the property of the first zone at the second time instance.

The first zone may be one of a plurality of zones forming a geographical area encompassing the first coverage area and second coverage area, and the method further comprises identifying, for each zone of the plurality of zones, each coverage area portion that covers that zone; determining a property of each zone of the plurality of zones based on the UE density of each coverage area portion covering that zone at the first time instance, wherein reconfiguring the wireless telecommunications network is based on the property of each zone of the plurality of zones at the first time instance.

The method may further comprise determining a property of each zone of the plurality of zones based on the UE density of each coverage area portion covering that zone at the second time instance, wherein reconfiguring the wireless telecommunications network is further based on the property of each zone of the plurality of zones at the second time instance.

The method may further comprise obtaining data indicating a measurement of the property in the first zone at the first time instance; determining an adjustment value based on the measurement of the property in the first zone at the first time instance and the determined property of the first zone at the first time instance based on the UE density in the first coverage area portion of the first set of coverage area portions at the first time instance and the UE density in the first coverage area portion of the second set of coverage area portions at the first time instance; applying the adjustment value to the determined property of the first zone at the second time instance.

The property of the first or each zone may be one or more of a group comprising: a count of UE, a cumulative data rate, spectral resource usage, a dropped call event, a radio link failure event, signal strength, and service type.

Reconfiguring the wireless telecommunications network may include one or more of a group comprising: adjusting a transmission characteristic of a first transceiver serving the first plurality of users in the first coverage area, adjusting a transmission characteristic of a second transceiver serving the second plurality of users in the second coverage area, adjusting the energy saving mode of the first transceiver, adjusting an energy saving mode of the second transceiver, reconfiguring the first transceiver to use a different technology, and reconfiguring the second transceiver to use a different technology.

The distance between each UE of the first plurality of UE and the first transceiver may be based on a timing offset value for that UE, and the distance between each UE of the second plurality of UE and the second transceiver may be based on a timing offset value for that UE.

The method may further comprise obtaining data identifying a coverage area of the first access point and/or the coverage area of the second access point. The coverage area(s) may be defined in absolute terms (e.g. coordinates) or relative terms (relative to the access point).

According to a second aspect of the disclosure, there is provided a computer program comprising instructions which, when the program is executed by a computer, cause the computer to carry out the method of the first aspect of the disclosure. The computer program may be stored on a computer readable carrier medium.

According to a third aspect of the disclosure, there is provided a data processing apparatus comprising a processor configured to perform the method of the first aspect of the disclosure.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Figure 1:
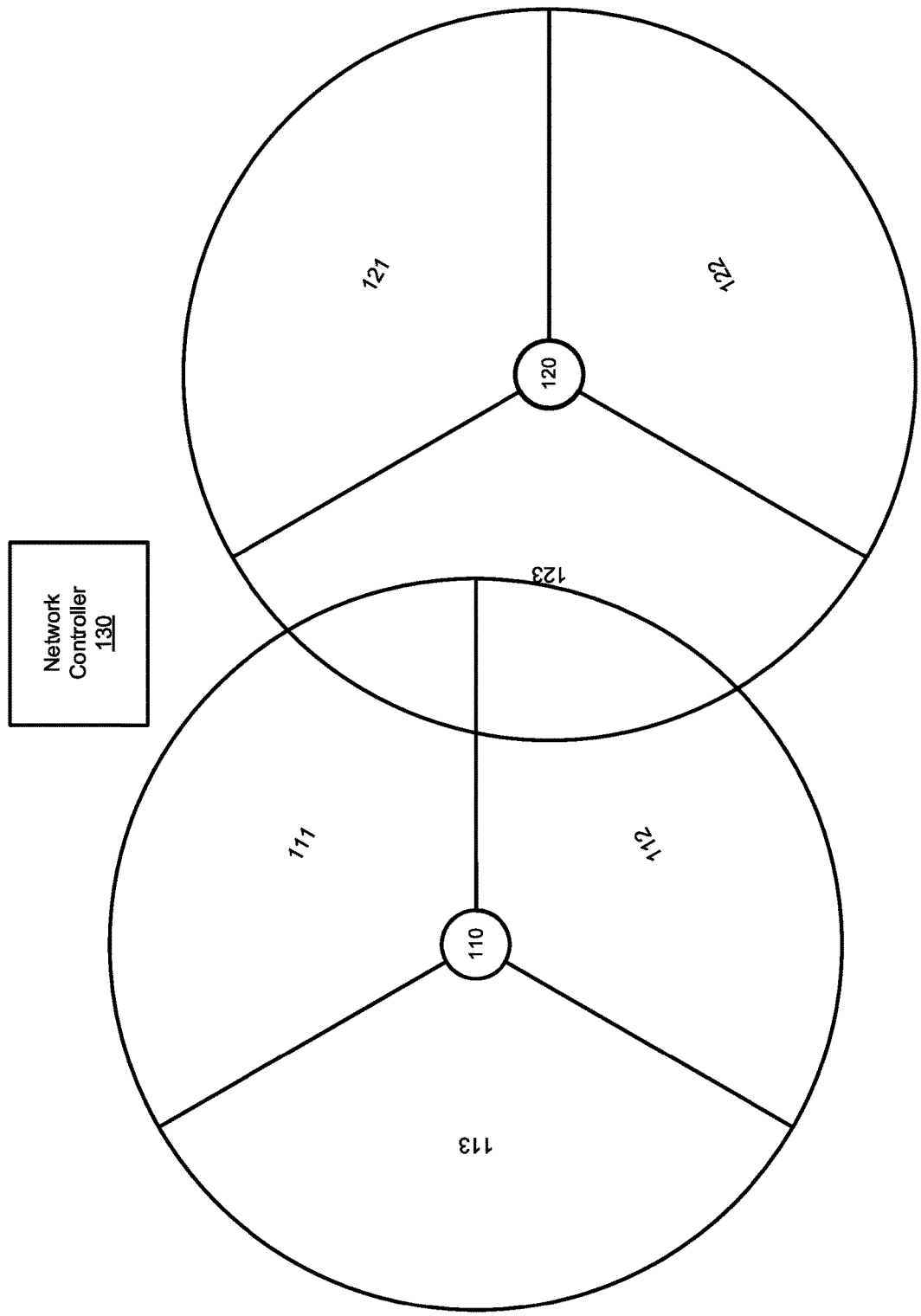
FIG. 1 is a schematic diagram of a wireless telecommunications network of a first embodiment of the present disclosure.
Figure 2:
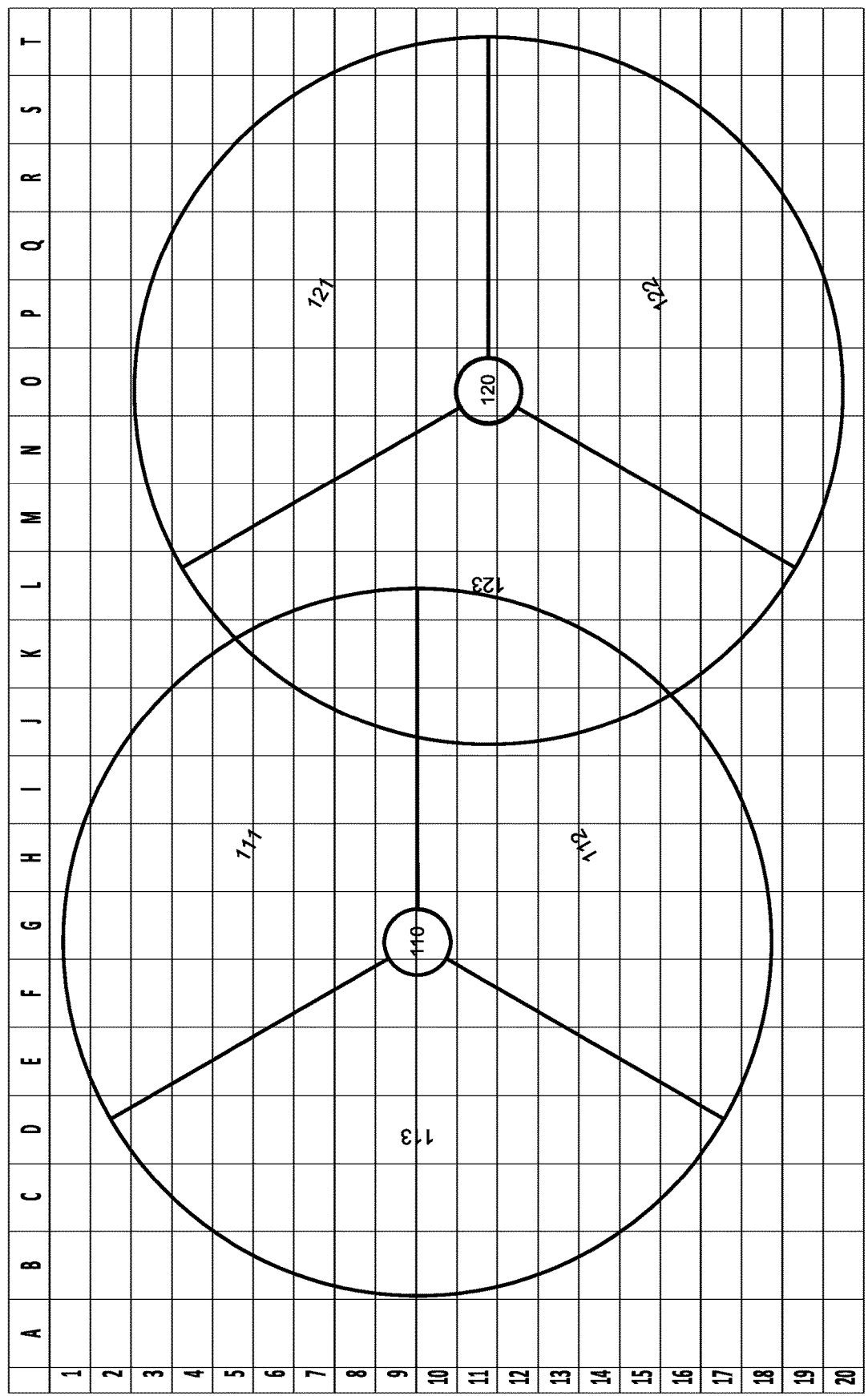
FIG. 2 is a schematic diagram of the wireless telecommunications network of FIG. 1, illustrating a geographical area divided into a grid of unit cells.

A first embodiment of a wireless telecommunications network 100 will now be described with reference to FIGS. 1 to 3. In this first embodiment, the wireless telecommunications network 100 is a cellular telecommunications network having a first base station 110 and a second base station 120. The first base station 110 is a sectorized base station having a first sector 111, second sector 112 and third sector 113. Similarly, the second base station 120 is a sectorized base station having a first sector 121, second sector 122 and third sector 123. The coverage area of the first base station 110 is the sum of the coverage areas of the first sector 111 area of the first base station 110, second sector 112 area of the first base station 110 and third sector 113 area of the first base station 110. The coverage area of the second base station 120 is the sum of the coverage areas of the first sector 121 of the second base station 120, second sector 122 of the second base station 120 and third sector 123 of the second base station 120.

The network 100 also includes a network controller 130. The network controller 130 is configured to receive data from the first base station 110 and second base station 120 and process this data to determine a distribution in the network 100. This is discussed in more detail in the description of the embodiment of the method of the present disclosure. The network controller 130 includes memory that stores base station geographical data indicating, for each base station in the network, a location of that base station and a coverage area of each sector of that base station. The coverage area of each sector may be defined by coordinates or may be defined in terms of transmission characteristics (such as beam direction, transmission power and beam width) such that the coverage area of the sector may be calculated. This base station geographical data may be updated to account for any changes in the coverage area of a base station (which may occur due to the base station changing its transmission characteristics). The network controller 130 also stores a map of a geographical area encompassing the coverage area of each base station in memory.

The network controller 130 also includes a processor having a mapping function that positions each base station in the network on the map (based on the base station's location) and correlates the coverage area of each sector of each base station in the network with the map. The mapping function is further configured to divide the geographical area into a grid of unit cells. An example of this process being applied to the geographical area, in which each cell in the grid covers a 100 square meters of the geographical area, is shown in FIG. 2, which also illustrates the locations of the first and second base stations 110, 120 and their coverage areas overlaid on this grid. Each cell of the grid is identified by a letter and number as shown in FIG. 2.

The mapping function is further configured to divide each sector of each base station into a plurality of portions, wherein each portion is defined by a respective minimum distance from the base station from which it is transmitted and a respective maximum distance from the base station from which it is transmitted. An example of this process being applied to the sectors of the first and second base stations 110, 120 is shown in FIG. 3. It can be seen that the first sector 111 of the first base station 110 is divided into three portions, wherein a first portion 111a of the first sector 111 of the first base station 110 is defined by a first distance $d^1$ from the first base station 110 to a second distance $d^2$ from the first base station 110, the second portion 111b of the first sector 111 of the first base station 110 is defined by the second distance $d^2$ from the first base station 110 to a third distance $d^3$ from the first base station 110, and the third portion 111c of the first sector 111 of the first base station is defined by the third distance $d^3$ from the first base station 110 to a fourth distance $d^4$ from the first base station 110. The other sectors of the first base station 110 and the sectors of the second base station 120 have similarly defined portions. FIG. 3 illustrates that at least one sector of the first base station 110 overlaps with one or more sectors of the second base station 120, and one or more sectors of the first base station 110 do not overlap with one or more sectors of the second base station 120.

Figure 3:
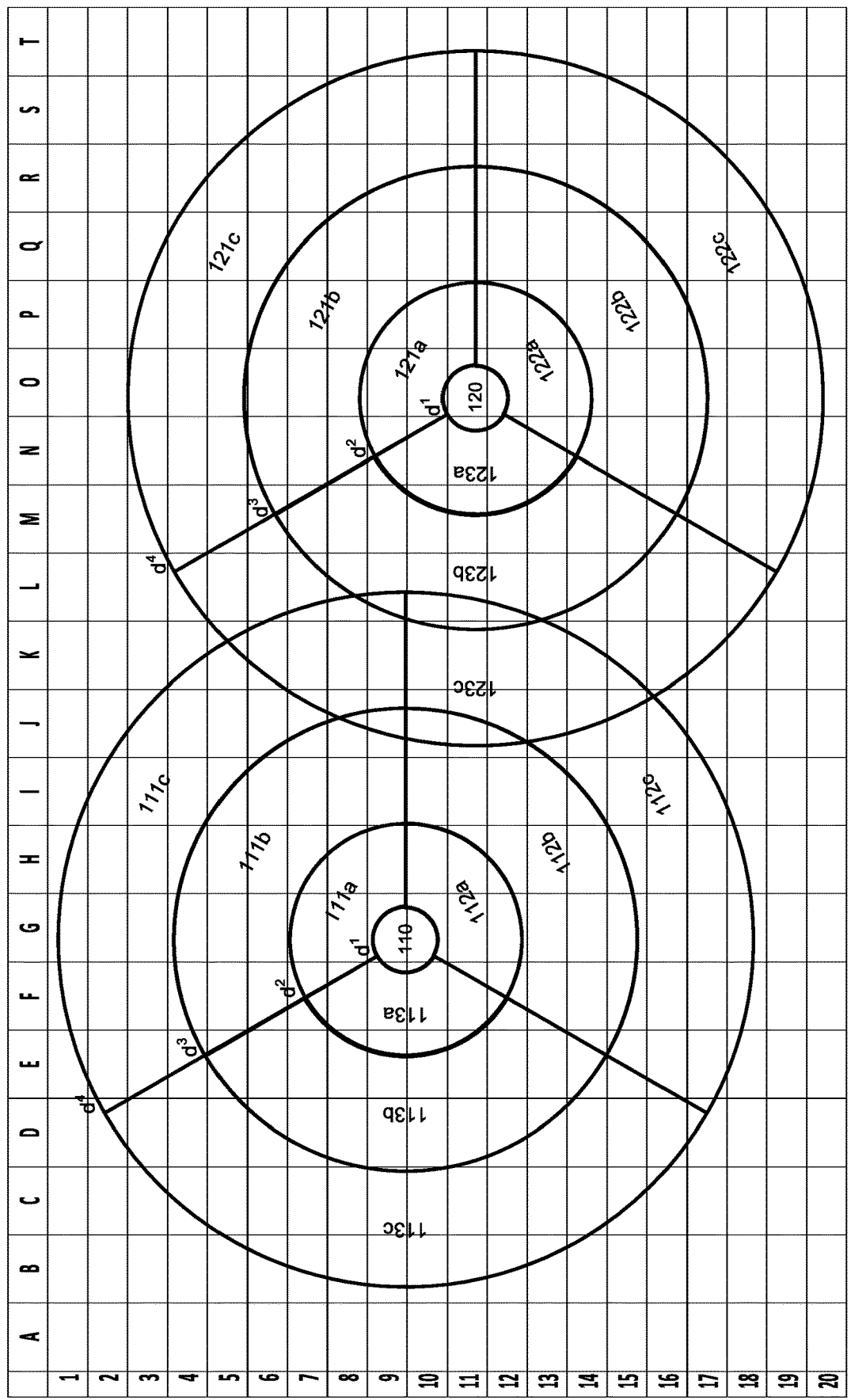
FIG. 3 is a schematic diagram of the wireless telecommunications network of FIG. 1, illustrating the geographical area of FIG. 2 and further illustrating a plurality of sector portions for each sector of a first and second base station of the network.

FIG. 3 also illustrates that a plurality of cells of the grid of the geographical area are covered by the coverage area of a sector portion or the coverage areas of a plurality of sector portions (where those sector portions overlap). The network controller 130 is configured to identify, for each sector portion of each base station, each cell of the grid that is covered by that sector portion's coverage area. Each cell may fall within zero, one or more sector portions. In this embodiment, it is determined that a cell falls within a particular sector portion by representing that cell as a single point (e.g. a midpoint of the cell) and determining whether that single point is within the boundary of that sector portion. The identity of each cell that is covered by each sector portion's coverage area is stored in memory. The network controller 130 may periodically update this data, for example following any change in the base station geographical data.

The network controller 130 is also configured to obtain connection data for each user of the first base station 110 and each user of the second base station 120. This connection data identifies, for each user, the base station that the user is connected to, the sector of the base station that the user is connected to, and a timing advance value for that user. A timing advance value represents an adjustment the user must apply to its uplink transmissions in order to synchronize downlink and uplink subframes at the serving base station. This value is determined by the serving base station and periodically updated. Furthermore, the base station identifier and sector identifier may change (e.g. due to a handover). The network controller 130 is therefore configured to obtain up to date connection data for each user for both the first and second base stations 110, 120, and store these in memory. The network controller's data may be updated by each base station pushing updates to the network controller 130 following any change in the connection data, or may be obtained on demand by the network controller 130 when performing an embodiment of a method of the present disclosure (discussed below).

Figure 4:
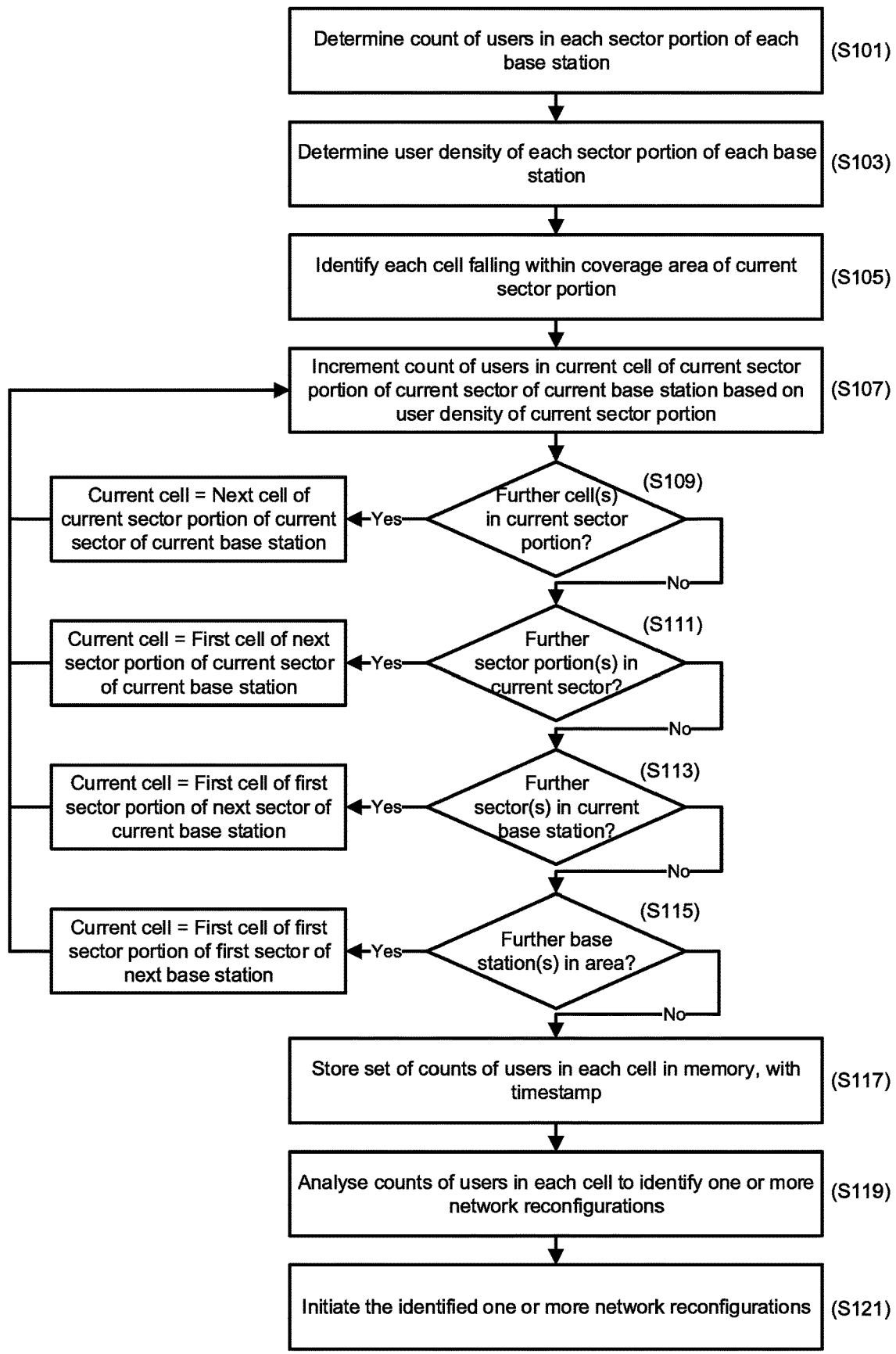
FIG. 4 is a flow diagram illustrating a first embodiment of a method of the present disclosure.

A first embodiment of a method of the present disclosure will now be described with reference to FIGS. 3 to 4. FIG. 3, as described above, is a map of the geographical area of the first and second base station 110, 120, illustrating a grid of cells and the coverage area of each sector of each base station. FIG. 4 is a flow diagram illustrating this first embodiment of the method of the present disclosure. In this first embodiment, the network controller is configured to determine a distribution of users in its network and reconfigure the network based on the determined distribution of users. In S101, the network controller 130 processes the connection data to determine a count of users within each sector portion of each base station. The sector identifier and the base station identifier in the connection data is used to identify a set of sector portions in which the user is positioned (the sector identifier alone may be used, if this also uniquely identifies the base station). For example, if a user has a base station identifier for the first base station 110 and a sector identifier for the first sector 111 of the first base station 110, then the user is positioned within the first portion 111a, second portion 111b, or third portion 111c of the first sector 111 of the first base station 110. The network controller 130 may determine which sector portion the user is positioned within using the timing advance value. That is, a distance between the user and serving base station may be determined by multiplying the timing advance value and the speed of the radio frequency waves transmitted between the user and serving base station. This distance may be compared to the minimum and maximum distances of each sector portion to determine which sector portion the user is positioned within. This process is repeated for each user for each base station in the connection data to determine the count of users in each sector portion of each base station.

In S103, the network controller 130 determines a user density of each sector portion of the first base station 110 and second base station 120. This is based on the count of users in each sector portion of each base station and the area covered by the sector portion. In the subsequent operations of this embodiment, the user density value of a sector portion of a base station may be multiplied by the coverage area of a cell covered by that sector portion so as to estimate the count of users in that cell that are served by that sector of the base station.

The network controller 130 then enters an iterative loop to calculate a count of users in each cell. This is achieved by:

1. In S105, starting with the first sector portion 111a of the first sector 111 of the first base station 110, identify each cell that falls within its coverage area (as noted above, this is stored in memory). Note that this sector portion is used as a starting sector portion as an example only, and any other sector portion could be used instead;
2. In S107, starting with the first cell identified in S105, increment a count of users in that cell by an amount equal to the user density of that sector portion (as determined in S103) multiplied by the area covered by that cell;
3. In S109, determine whether all cells covered by the current sector portion have been processed. If not, repeat S107 for the remaining cells. If so, proceed to S111;
4. In S111, determine whether all sector portions of the current sector have been processed. If not, repeat S105 to S109 for the remaining sector portions of the current sector (e.g. the second sector portion 111b and third sector portion 111c of the first sector). If so, proceed to S113;
5. In S113, determine whether all sectors of the current base station have been processed. If not, repeat S105 to S111 for the remaining sectors of the current base station (e.g. the second sector 112 and third sector 113 of the first base station 110). If so, proceed to S115; and
6. In S115, determine whether all base stations covered by the grid have been processed. If not, repeat S105 to S113 for the remaining base stations (e.g. the second base station 120).

Once S115 is complete such that all base stations have been processed, the network controller 130 has calculated a count of users in each cell based on the user density in each sector portion of each base station that covers that cell. For example, cell K8 is covered by sector portion 111c of the first base station 110 and sector portion 123c of the second base station 120, such that the count of users is the sum of the estimated count of users in cell K8 served by the third sector portion 111c of the first sector 111 of the first base station 110 and the estimated count of users in cell K8 that are served by the third sector portion 123c of the third sector 123 of the second base station 120.

In S117, the network controller 130 stores the count of users in each cell in memory, together with a current timestamp. In S119, the network controller 130 analyses these counts of users in each cell to identify one or more network reconfigurations and, in S121, sends one or more messages to the first and/or second base station to initiate these network reconfigurations. These network reconfigurations may be one or more of:

Adjusting the coverage area of a sector of a base station to improve connectivity in an area where there is a relatively high count of users. For example, if cell 111 is determined to have a relatively high count of users, then the transmission characteristics of the second base station 120 may be configured to extend the coverage area of the third sector portion 123c of the third sector 123 of the second base station 120 to cover cell 111 and provide additional capacity to that area;

Adjusting the energy saving mode of a base station to improve connectivity or improve energy efficiency in an area. For example, if all cells covered by a sector have no users then that sector may be switched to energy saving mode (similarly, this reconfiguration may be triggered for one sector where all users of all cells covered by that sector may also be served by another sector/base station), and Reconfiguring a base station to use different technology (such as different antenna technology, new compute capabilities, and/or a different protocol).

This first embodiment provides the benefit of enabling the network controller 130 to determine a distribution of users in a geographical area, and reconfiguring the network based on this distribution, based on data that has already been collected and therefore requires no further interaction with users. That is, each base station in the network would calculate the timing advance value during connection establishment such that this value is available for each user. The network controller 130 therefore does not require the user to perform any additional processing or use any other resource in order for the network controller 130 to determine its position. This overcomes the issues of the existing geolocation method (which requires substantial additional processing) and MDT (which only works for a subset of users and also requires additional messaging between the user and base station). Furthermore, this process accounts for overlapping coverage areas of multiple sectors in a geographical area such that the overall count of users in an overlapping coverage area is the sum of users contributed from each sector.

An enhancement to the first embodiment will now be described. Following S117, the network controller 130 loops back to S101 for another performance of S101 to S117 at a subsequent point in time. The result of this further performance is a new set of counts of users in each cell stored in memory with a new timestamp The network controller 130 may iterate through S101 to S117 periodically. In this enhancement, S119 involves an analysis of a plurality of sets of counts of users in each cell, wherein each set of counts is associated with a timestamp that falls within a particular time period. This enables the network controller 130 to determine how the distribution changes over that time period, such as:

how users move between cells within the time period, and
how a user count in a particular cell may change at a particular periodicity within the time period (for example, how the user count in a particular cell may change at a particular time across different days).

The network controller 130 may then identify network reconfigurations based on the plurality of sets of counts of users in each cell. For example, an adjustment to a transmission characteristic of a base station to provide additional capacity to a cell with a relatively high count of users may be limited to a particular time period when that cell experiences an increase in users. In another example, a base station or sector thereof that covers one or more cells that handle relatively high counts of users in a particular time period can adjust their handover thresholds to offload excessive capacity to less congested neighboring base stations.

The above first embodiment determines the distribution of users in a geographical area. However, the skilled person will understand that this method may be used to determine other distributions by using other data. For example, the connection data may include an indication of a data rate for each user (such as download throughput and/or upload throughput). In S107, in which the count of users in each cell is determined, the network controller 130 may determine a cumulative data rate for the users in each cell (this may be based on an average data rate across all users in the sector portion). The network controller 130 may therefore be configured to determine a distribution of data rate (e.g. cumulative or average) in a geographical area. The network controller 130 may then identify network reconfigurations based on this distribution of data rate. These distributions may also be analyzed collectively so as to highlight cells with a relatively high count of users but having a relatively low data rate (such as a cell covering a train station) or a relatively low count of users but having a relatively high cumulative data rate (such as a cell covering a suburban area). The method may also be used to determine other distributions in the geographical area, such as a distribution of spectral resource usage, distribution of dropped call events, distribution of radio link failure events, distribution of signal strength, distribution of service type, and a distribution of voice calls.

In a further enhancement to the above process, the network controller 130 also collects geolocation and/or MDT data from the users of the first and second base station 110, 120. This may be used to determine a distribution across the geographical data. This distribution using geolocation and/or MDT data may be used as a labelled dataset in a machine learning method to learn a mapping between how a distribution derived from geolocation and/or MDT data differs from a distribution derived from the above first embodiment. An adjustment may then be applied to a count of users derived from the first embodiment for any cell where there is also geolocation and/or MDT data. Furthermore, the adjustment may be applied to other cells where there is insufficient geolocation and/or MDT data, by applying a proportionate adjustment.

Figure 5:
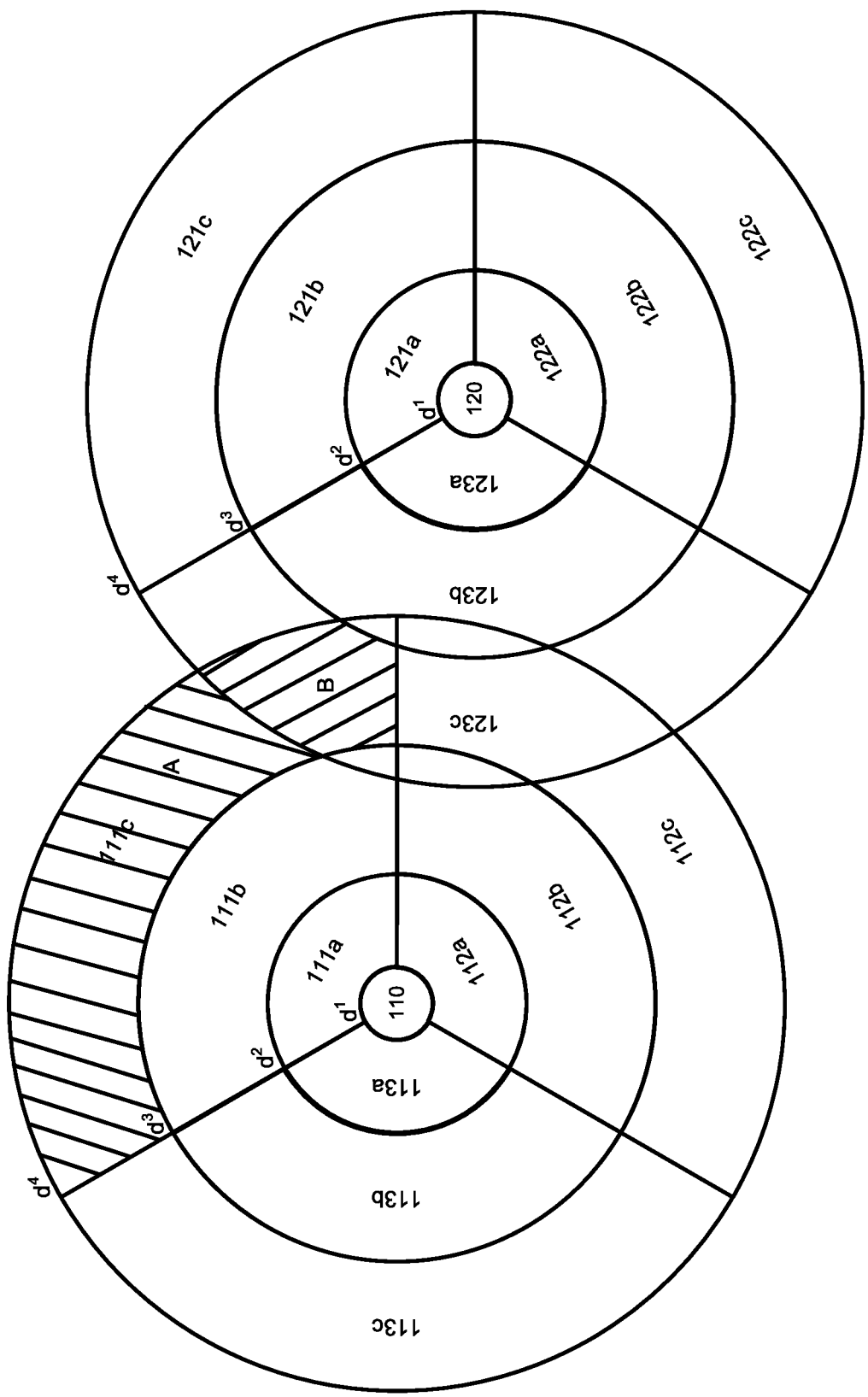
FIG. 5 is a schematic diagram of an embodiment of a wireless telecommunications network of the present disclosure.

The skilled person will understand that the use of a map that is divided into a grid of unit cells allows the network controller 130 to methodically count users in each cell as a sum of each sector portion of each base station covering that cell. However, there are alternative ways of counting users in a geographical area without dividing a map of the geographical area into a grid of cells. That is, using boundary coordinates of each sector portion, the network controller 130 may explicitly identify overlapping zones of multiple sector portions. The network controller 130 may also use these boundary coordinates of each sector portion to identify zones that do not overlap with another sector portion. This concept is illustrated in FIG. 5, in which zone A (highlighted by forward hatching lines) is a zone identified as being covered by the third sector portion 111c of the first sector 111 of the first base station 110 only, and zone B (highlighted by backward hatching lines) is a zone identified as being covered by the third sector portion 111c of the first sector 111 of the first base station and the third sector portion 123c of the third sector 123 of the second base station 120. The network controller 130 may estimate the count of users in a zone served by each sector portion based on the user density value of that sector portion of a base station multiplied by the coverage area of the zone. The count of users for zone A may therefore be determined by multiplying the user density value of the third sector portion 111c of the first sector 111 of the first base station 110 by the coverage area of zone A. The count of users for zone B may therefore be determined as a sum of the user density value of the third sector portion 111c of the first sector 111 of the first base station 110 multiplied by the coverage area of zone B and the user density value of the third sector portion 123c of the third sector 123 of the second base station 120 multiplied by the coverage area of zone B.

In the above embodiment, the first and second base stations 110, 120 are tri-sector base stations and each sector is divided into three portions covering consecutively more distant contiguous ranges from the base station. The skilled person will understand that these three sector portions are just an example, and each sector may be divided into any number (greater than 2) of sector portions. Different sectors may also be divided into different numbers of sector portions. Furthermore, the above embodiment may apply to omnidirectional base stations, such that a single coverage area of the base station is divided into portions of consecutively more-distant contiguous ranges from the base station (i.e. annuli), or to a beamforming base station in which each beam is divided into portions of consecutively more distant contiguous ranges from the base station.

In the embodiment above, the distance between the UE and the serving base station is determined based on the timing advance value. Timing advance values are applicable to the $2^{nd}$, $4^{th}$ and $5^{th}$ generation of cellular telecommunications network protocols. The skilled person will understand that similar physical layer measurements of time delay between the UE and serving base station (from which the distance between the UE and serving base station can be derived) are made in $3^{rd}$ generation cellular telecommunication protocols, which are obtained by the serving base station to shift its timing of its rake receivers. The use of the timing advance (or equivalent) values can be advantageous as it is an absolute measure of time (and therefore distance) that is reported by the UE. However, the skilled person will understand that other techniques may be used to obtain the distance between the serving base station and the UE using data that is already collected by the serving base station to facilitate communications between the UE and serving base station. For example, the UE may report the signal strength (e.g. Reference Signal Received Power (RSRP) or Reference Signal Received Quality (RSRQ)), which may be used to calculate the distance using a path loss model.

The skilled person will also understand that the present disclosure may be applied to any other form of wireless network having a first access point serving one or more users in a first coverage area and a second access point serving one or more users in a second coverage area, where those first and second coverage areas overlap. Furthermore, the first and second access points may be different transceivers of the same node, such as different sectors of the same base station.

The skilled person will understand that any combination of features is possible within the scope of the disclosure, as claimed.

The invention claimed is:

1. A method of configuring a wireless telecommunications network, the wireless telecommunications network having a first transceiver serving a first plurality of User Equipment (UE) in a first coverage area, and a second transceiver serving a second plurality of UE in a second coverage area, the method comprising:
    obtaining an indication of a respective distance between each UE of the first plurality of UE and the first transceiver at a first time instance and a second time instance, wherein the respective distances are used by the first transceiver to facilitate communications with the respective UE;
    obtaining an indication of a respective distance between each UE of the second plurality of UE and the second transceiver at the first time instance and the second time instance, wherein the respective distances are used by the second transceiver to facilitate communications with the respective UE;

dividing the first coverage area into a first set of coverage area portions;

dividing the second coverage area into a second set of coverage area portions;

assigning each UE of the first plurality of UE to a respective coverage area portion of the first set of coverage area portions based on the respective distances between that UE and the first transceiver at the first time instance and the second time instance so as to determine respective UE densities in each coverage area portion of the first set of coverage area portions at the first time instance and the second time instance;

assigning each UE of the second plurality of UE to a respective coverage area portion of the second set of coverage area portions based on the respective distances between that UE and the second transceiver at the first time instance and the second time instance so as to determine respective UE densities in each coverage area portion of the second set of coverage area portions at the first time instance and the second time instance;

identifying a first zone covered by a first coverage area portion of the first set of coverage area portions and by a first coverage area portion of the second set of coverage area portions;

determining respective properties of the first zone at the first time instance and the second time instance based on the respective UE densities in the first coverage area portion of the first set of coverage area portions at the first time instance and the second time instance and the respective UE densities in the first coverage area portion of the second set of coverage area portions at the first time instance and the second time instance; and reconfiguring the wireless telecommunications network based on the respective properties of the first zone at the first time instance and the second time instance.

2. The method as claimed in claim 1, wherein the first zone is one of a plurality of zones forming a geographical area encompassing the first coverage area and the second coverage area, and the method further comprises:

identifying, for each zone of the plurality of zones, each coverage area portion that covers that zone; and determining a property of each zone of the plurality of zones based on the UE density of each coverage area portion covering that zone at the first time instance, wherein reconfiguring the wireless telecommunications network is based on the property of each zone of the plurality of zones at the first time instance.

3. The method as claimed in claim 2, further comprising:

determining a property of each zone of the plurality of zones based on the UE density of each coverage area portion covering that zone at the second time instance, wherein reconfiguring the wireless telecommunications network is further based on the property of each zone of the plurality of zones at the second time instance.

4. The method as claimed claim 3, further comprising:

obtaining data indicating a measurement of the property in the first zone at the first time instance;

determining an adjustment value based on the measurement of the property in the first zone at the first time instance and the determined property of the first zone at the first time instance based on the UE density in the first coverage area portion of the first set of coverage area portions at the first time instance and the UE density in the first coverage area portion of the second set of coverage area portions at the first time instance; and applying the adjustment value to the determined property of the first zone at the second time instance.

5. The method as claimed in claim 1, wherein the property of the first zone is one or more of a group comprising: a count of UE, a cumulative data rate, a spectral resource usage, a dropped call event, a radio link failure event, a signal strength, and a service type.

6. The method as claimed in claim 1, wherein reconfiguring the wireless telecommunications network includes one or more of a group comprising: adjusting a transmission characteristic of the first transceiver serving the first plurality of users in the first coverage area, adjusting a transmission characteristic of the second transceiver serving the second plurality of users in the second coverage area, adjusting an energy saving mode of the first transceiver, adjusting an energy saving mode of the second transceiver, reconfiguring the first transceiver to use a different technology, and reconfiguring the second transceiver to use a different technology.

7. The method as claimed in claim 1, wherein the distance between each UE of the first plurality of UE and the first transceiver is based on a timing offset value for that UE, and the distance between each UE of the second plurality of UE and the second transceiver is based on a timing offset value for that UE.

8. A computer program stored in a non-transitory computer-readable medium comprising instructions which, when the computer program is executed by a computer, cause the computer to carry out the method of claim 1.

9. A non-transitory computer-readable medium comprising the computer program of claim 8.

10. A data processing apparatus comprising a processor configured to perform the method of claim 1.

* * * * *